(12) United States Patent
Cheong

(10) Patent No.: US 6,592,220 B1
(45) Date of Patent: Jul. 15, 2003

(54) EYEGLASS FRAME WITH REMOVABLY MOUNTED LENSES

(76) Inventor: Lak Cheong, 38 Tai Tam Road, BLK 4A, 11/F, Pacific View (HK)

( * ) Notice: Subject to any disclaimer, the term of this patent is extended or adjusted under 35 U.S.C. 154(b) by 0 days.

(21) Appl. No.: 10/059,071

(22) Filed: Jan. 30, 2002

(51) Int. Cl.[7] .............................. G02C 1/00; G02C 1/04
(52) U.S. Cl. ..................... 351/106; 351/86; 351/103
(58) Field of Search ........................... 351/86, 83, 106, 351/103, 41, 96, 93

(56) References Cited

U.S. PATENT DOCUMENTS

| | | | |
|---|---|---|---|
| 3,838,914 A | * | 10/1974 | Fernandez .................... 351/86 |
| 4,176,921 A | | 12/1979 | Matthias |
| D263,479 S | | 3/1982 | Van Excel et al. |
| 4,357,080 A | | 11/1982 | Solomon |
| 4,360,252 A | | 11/1982 | Solomon |
| 4,402,578 A | | 9/1983 | Minart |
| 4,822,158 A | | 4/1989 | Porsche |
| 5,048,944 A | | 9/1991 | Porsche |
| 5,293,185 A | | 3/1994 | Berger et al. |
| 5,321,442 A | * | 6/1994 | Albanese ..................... 351/44 |
| 5,373,331 A | | 12/1994 | Vallalla et al. |
| 5,455,639 A | | 10/1995 | Magdelaine et al. |
| 5,500,694 A | | 3/1996 | Roever et al. |
| 5,587,747 A | | 12/1996 | Bernheiser |
| 6,074,059 A | | 6/2000 | Glass et al. |
| 6,086,199 A | | 7/2000 | Holland et al. |
| 6,227,665 B1 | | 5/2001 | Pernicka et al. |

* cited by examiner

Primary Examiner—Hung Xuan Dang
(74) Attorney, Agent, or Firm—Robert L. Epstein; Harold James; James & Franklin, LLP

(57) ABSTRACT

Lenses are removably mounted on the brow bar of an eyeglass frame. A coupling part is fixed to the top of each lens, preferably by a rim member attached to the lens by conventional techniques. The coupling part is composed of magnetically attractive material and includes a protrusion. Each side of the brow bar carries one or more magnets to engage a coupling part and a recess to receive a protrusion to insure proper positioning of the lens relative to the brow bar. The coupling part may be retained behind, on top of, below or in front of the brow bar.

22 Claims, 7 Drawing Sheets

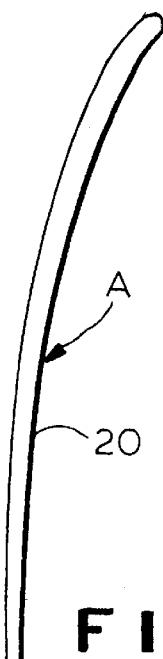
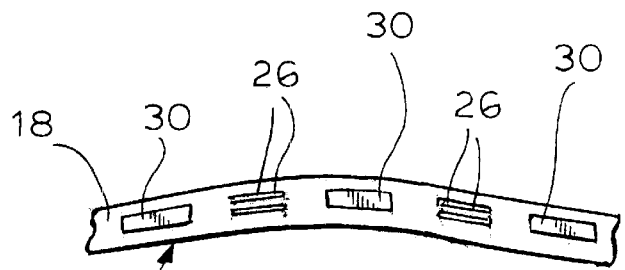
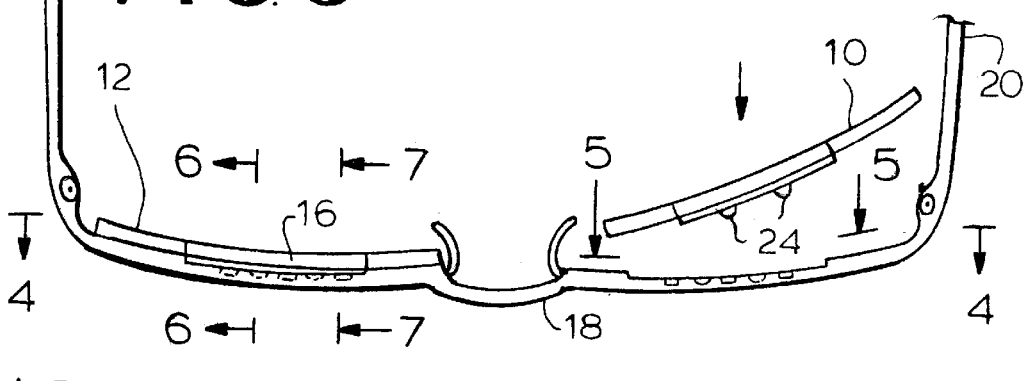
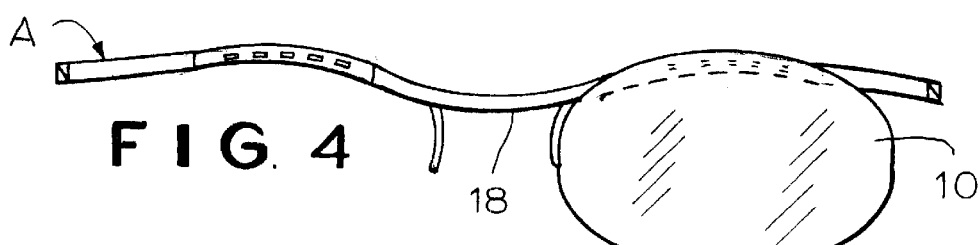
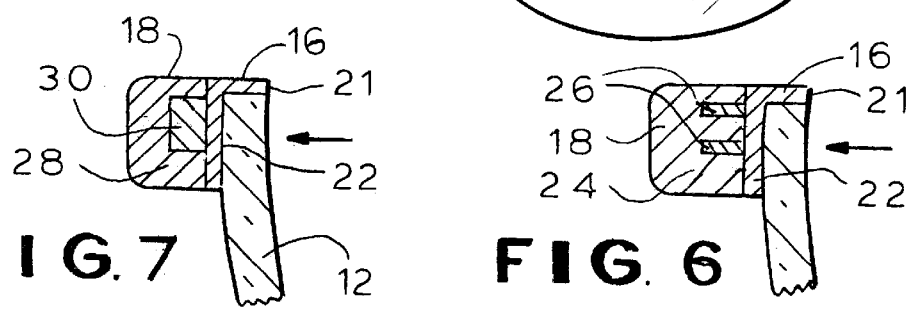
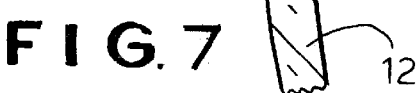

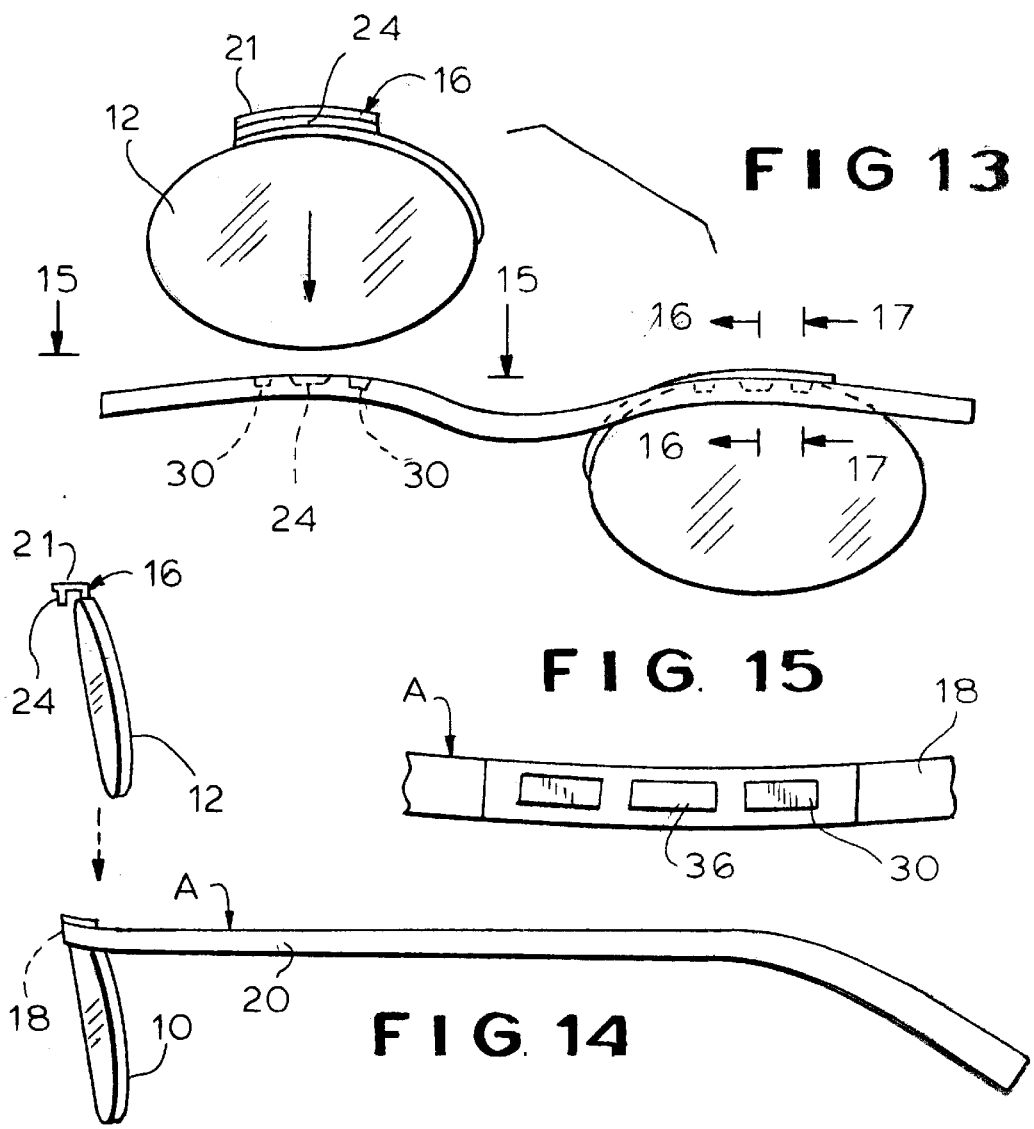

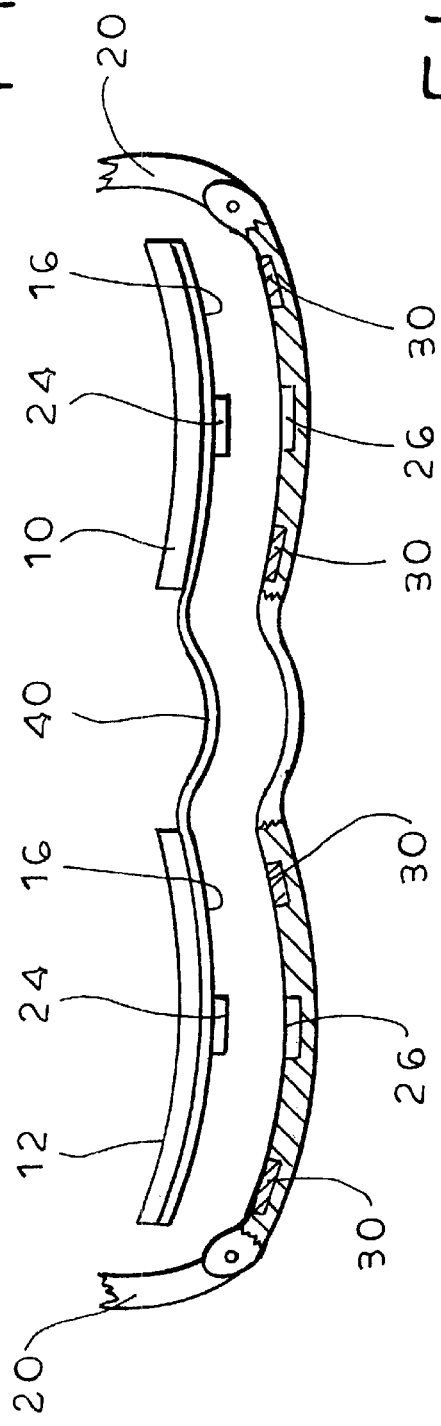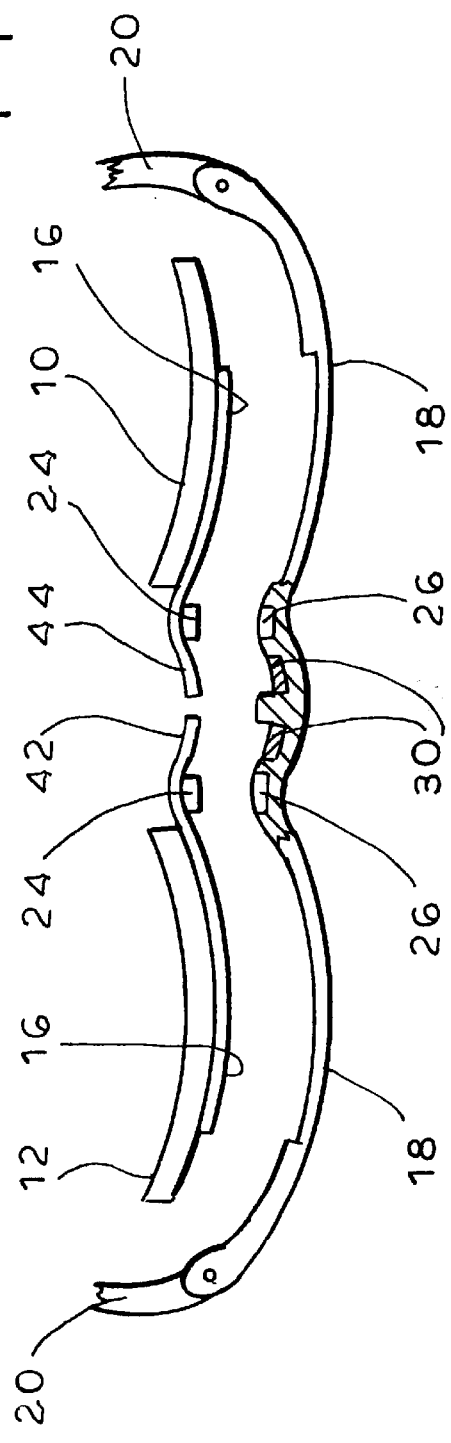

EYEGLASS FRAME WITH REMOVABLY MOUNTED LENSES

The present invention relates to eyewear and more particularly to an eyeglass frame with removably mounted lenses in which the lenses can be fabricated by a eyewear professional using conventional techniques and tools, and in which the lenses can be interchanged by the user in a simple, intuitive manner.

Eyeglasses include a frame, usually made of metal, plastic or combinations thereof, and a pair of optical lenses, mounted to the frame. The lenses may be prescription. They may also be coated and/or tinted different colors, to various degrees, to act as sunlight attenuators.

Although most lenses are fixedly mounted to the frame, and hence can be changed only by an eyewear professional, such as an optician or optical lab technician, the desirability of making the lenses removeable, and hence interchangeable by the user, has long been recognized. Many structures have been devised for this purpose, including various types of clips, clamps, gaskets, frame opening devices and the like. However, none have been commercially successful to any degree because special tools and/or fabrication techniques are required on the part of the eyewear professional to produce the lenses and because the lens mounting mechanisms are too complicated for the consumer to easily understand and use.

The present invention overcomes those drawbacks by requiring the eyewear professional to use only conventional techniques and tools to fabricate the lenses. Magnetic coupling of the lenses to the frame and a simple lens positioning structure are employed to create a system in which the lenses are removably mounted and properly positioned on the frame brow bar in a manner which is intuitively obvious to the user, requiring no advance instruction or special skill.

It is, therefore, a prime object of the present invention to provide an eyeglass frame with removeably mounted lenses which utilizes magnetic coupling system and a mechanical lens positioning structure.

It is another object of the present invention to provide an eyeglass frame with removeably mounted lenses which permits the eyewear professional to fabricate the lenses using conventional techniques and tools.

It is another object of the present invention to provide an eyeglass frame with removeably mounted lenses which is simple to use, requiring no advance instruction or special skill on the part of the user.

In accordance with one aspect of the present invention, apparatus for removably mounting a lens to an eyeglass frame is provided. It includes a coupling part and means for affixing the coupling part to the lens, proximate the top of the lens. A brow bar is provided. Means are provided for magnetically engaging the coupling part and the brow bar. Means are also provided for positioning the coupling part relative to the brow bar.

The magnetic engaging means includes magnetic means affixed to either the coupling part or the brow bar. The other one of the coupling part and brow bar comprises magnetically attractive material.

The lens positioning means includes a protrusion extending from either the coupling part or the brow bar. A protrusion receiving recess is located on the other one of the coupling part and the brow bar.

The brow bar has a rear surface. The protrusion may extend in a direction substantially perpendicular to that surface. Preferably, the magnetic means and the protrusion are directed in substantially opposite directions.

The magnetic means may include one or more magnets. The lens positioning means may include one or more protrusions. The lens positioning means includes a number of protrusion receiving recesses equal to the number of protrusions.

In accordance with another aspect of the present invention, apparatus for removably mounting a lens to an eyeglass frame is provided. The apparatus includes a coupling part affixed to the lens, proximate the top of the lens. The coupling part has a surface. A brow bar having a surface is provided. The coupling part surface is adapted to abut the brow bar surface. Means are associated with one of the surfaces for magnetically engaging the coupling part and the brow bar. Means are located on one of the surfaces for positioning the lens relative to the brow bar. The brow bar surface may be the rear surface of the brow bar, the top surface of the brow bar, the front surface of the brow bar or the bottom surface of the brow bar.

The coupling part surface may be the front surface of the part, the bottom surface of the the part, the rear surface of the part or the bottom surface of the part.

The magnetic engaging means includes magnetic means affixed to one of the surfaces. The other one of the surfaces includes magnetically attractive material.

The lens positioning means includes a protrusion extending from one of the surfaces. A protrusion receiving recess is situated on the other one of the surfaces.

In accordance with another aspect of the present invention, apparatus for removably mounting first and second lenses to an eyeglass frame is provided. The apparatus includes first and second coupling parts affixed to the first and second lenses, respectively, proximate the tops thereof. A brow bar is provided. Means are provided for magnetically engaging the first coupling part and the second coupling part at spaced locations on the brow bar. Means are provided for positioning the first coupling part and second coupling part relative to the brow bar.

The magnetic engaging means include first and second magnetic means. The first magnetic means is affixed to either the first coupling part or the brow bar. The second magnetic means is affixed to either the second coupling part or the brow bar.

The lens positioning means includes first and second protrusions and first and second protrusion receiving recesses. The first protrusion and the first recess are each associated with a different one of the first coupling part and the brow bar, respectively. The second protrusion and the second recess are each associated with a different one of the second coupling part and the brow bar, respectively.

Each of the first and second magnetic means may include one or more magnets. When more than one magnet is included, each of the first and second recesses is located between magnets.

Means for connecting the first and second coupling parts may be provided. The connecting means may align with the bridge of the brow bar. It may carry the positioning means.

To these and such other objects which may hereinafter appear, the present invention relates to an eyeglass frame with removably mounted lenses, as set forth in detail in the following specification and recited in the annexed claims, taken together with the accompanying drawings, wherein like numerals refer to like parts, and in which:

FIG. 3 is a top plan view of a first preferred embodiment of the present invention;

FIG. 4 is a rear view taken along line 4—4 of FIG. 3;

FIG. 5 is an enlarged view of a section of the brow bar taken along line 5—5 of FIG. 3;

FIG. 6 is an enlarged cross-sectional view taken along line 6—6 of FIG. 3;

FIG. 7 is an enlarged cross-sectional view taken along line 7—7 of FIG. 3;

FIG. 13 is a front view of a third preferred embodiment of the present invention;

FIG. 14 is a side view of the embodiment of FIG. 13;

FIG. 15 is an enlarged cross-section view taken along line 15—15 of FIG. 13;

FIG. 16 is an enlarged cross-sectional view taken along line 16—16 of FIG. 13;

FIG. 17 is an enlarged cross-sectional view taken along line 17—17 of FIG. 13;

FIG. 22 is a top exploded view of a fifth preferred embodiment of the present invention in which the coupling parts are connected;

FIG. 24 is a top exploded view of a seventh preferred embodiment of the present invention which is similar to the sixth preferred embodiment except that the coupling parts are not connected.

Figure 1:
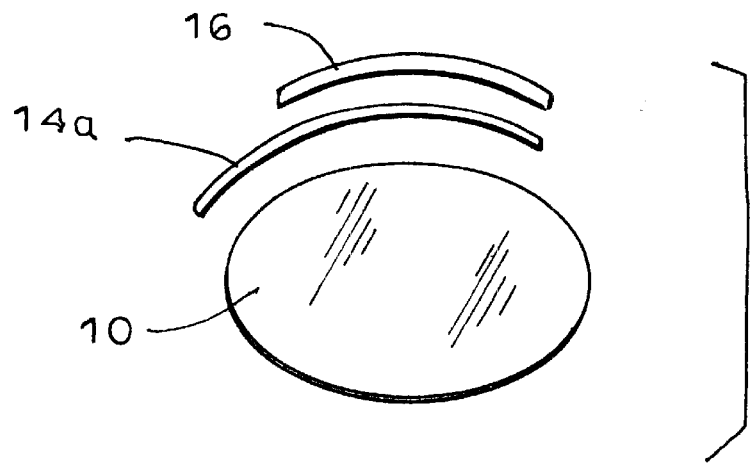
FIG. 1 is an exploded front view of a lens of the present invention with a partial rim member.

Several preferred embodiments of the present invention are disclosed. All embodiments include the same basic components and function is essentially the same manner. The only significant difference in the first four embodiments is the configuration of the lens coupling part and its position relative to the brow bar. In the fifth and sixth preferred embodiments, the coupling parts are connected together. In the sixth and seventh preferred embodiments, the magnets are situated in the bridge of the brow bar.

Each embodiment includes first and second optical lenses 10, 12 which may be prescription, tinted and/or coated for light attenuation or both. A coupling part 16 is fixed to the top of each lens. A rim member 14, which partially or fully encircles the lens, may be used for this purpose.

Coupling part 16 may be attached to or integral with the rim member 14, at a position that will align with the top of the lens. Each coupling part 16 is associated with a different side of a brow bar 18 which forms part of the eyeglass frame. The frame also includes hingeably mounted temple pieces 20, as is conventional.

Magnetic engaging means, in the form of one or more permanent magnets 30, and lens positioning means, in the form of one or more protrusion/recess combinations 24, 26, are provided to removeably mount and accurately position the lenses to the brow bar. The brow bar can be made of any material. However, titanium is commonly used. Magnets 30 are nested in the brow bar in recesses provided for that purpose. The coupling parts 16 are made in whole or in part of magnetically attractive material, such as ferrous metal. The protrusions 24 can be located on either the coupling part or on the brow bar, with the protrusion receiving recesses 26 on the other one of the coupling part and brow bar.

Figure 2:
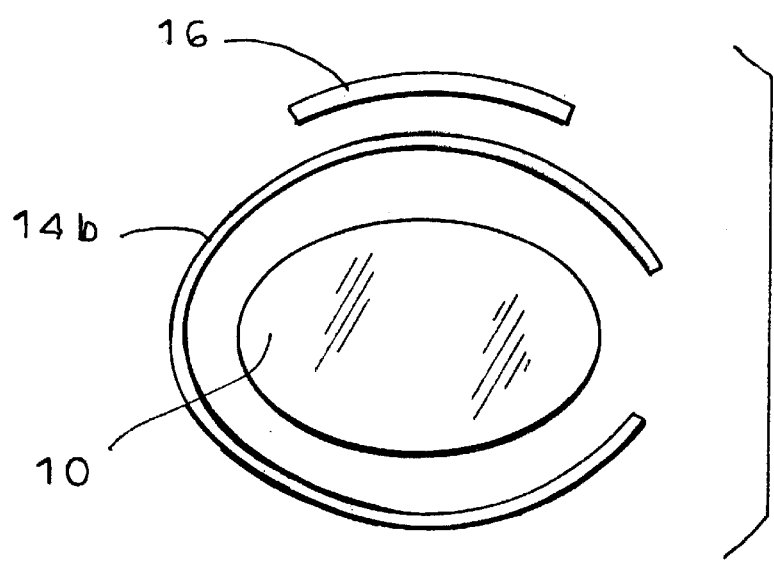
FIG. 2 is an exploded front view of a lens of the present invention with a full rim member.
Figure 8:
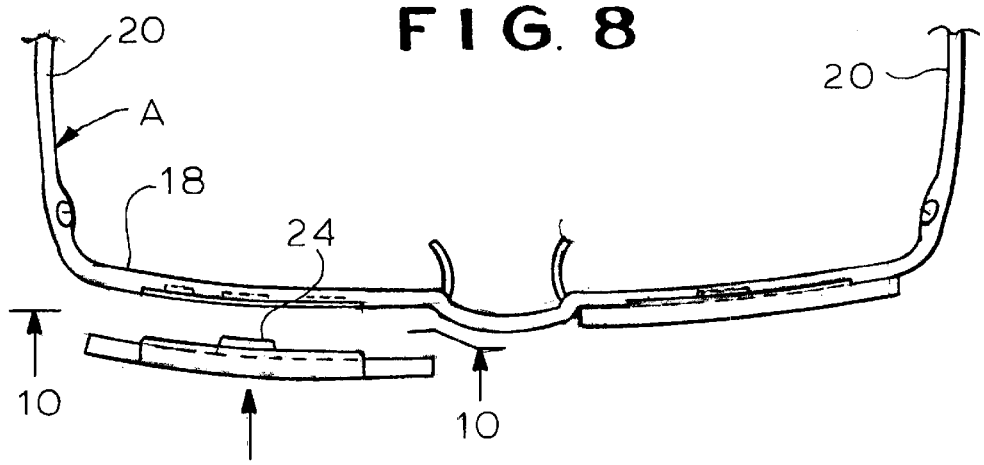
FIG. 8 is a top plan view of a second preferred embodiment of the present invention.
Figure 9:
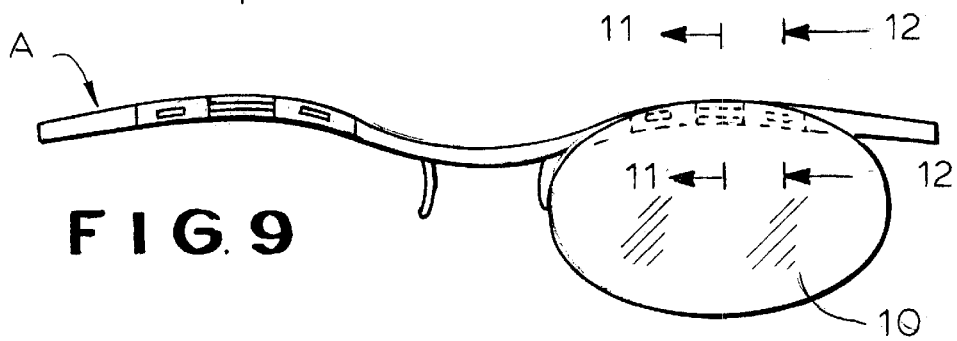
FIG. 9 is a front view of the embodiment of FIG. 8.
Figure 10:
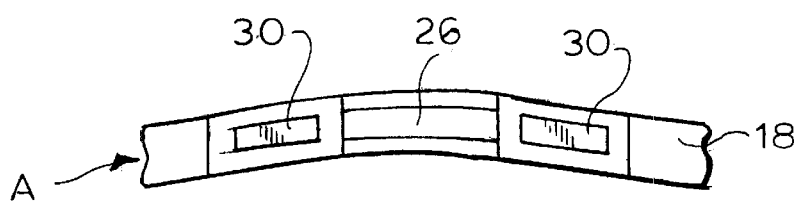
FIG. 10 is an enlarged view taken along line 10—10 of FIG. 8.
Figure 11:
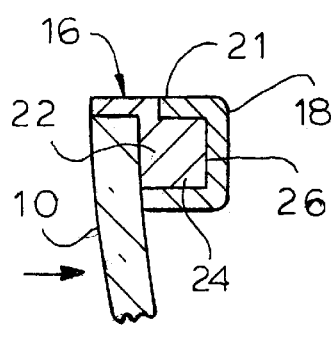
FIG. 11 is an enlarged cross-sectional view taken along line 11—11 of FIG. 9.
Figure 12:
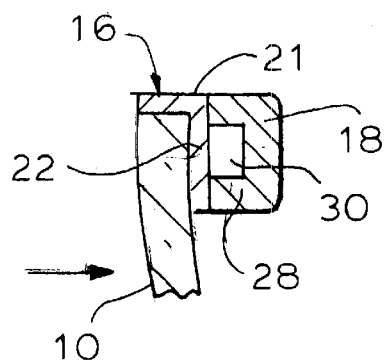
FIG. 12 is an enlarged cross-sectional view taken along line 12—12 of FIG. 9.

FIGS. 1 and 2 illustrate two techniques for affixing the coupling part to the lens using rim members of different types. FIG. 1 shows a partial rim member 14a used to affix coupling part 16 to lens 10. FIG. 2 shows a full rim member 14b employed to affix coupling part 16 to lens 10. Whether the partial rim member 14a or full rim member 14b are employed is a matter of choice. Either way, the rim member can be fixed to the edge of the lens by any conventional method.

For example, the partial rim member 14a may be attached to a nylon wire (not shown) which is situated within a groove around the edge of the lens, as is conventional in the optical industry. The full rim member 14b may be attached to the lens by cutting a pointed bevel along the edge of the lens which fits into a triangular groove in the rim member, as is also conventional. Another conventional attaching technique (not shown) which can be utilized is to drill a hole through the lens and attach the coupling part directly to the lens by a screw, eliminating the rim member altogether. These lens attachment methods are standard in the optical industry and well known to eyewear professionals. As they form no part of the present invention, the details are not illustrated. The only thing which is important to the invention is that some means be provided to affix the coupling part to the lens.

FIGS. 3–7 illustrate the first preferred embodiment of the present invention. In this embodiment, the operative portion of the coupling part is located behind the brow bar.

FIG. 3 illustrates the eyeglass frame, generally designated A. Frame A includes a brow bar 18 and temple pieces 20 hingeably mounted at either side of the brow bar, as is conventional.

Each lens 10, 12 has a coupling part 16 affixed to the top thereof. In this embodiment, coupling part 16 takes the form of an upside down "L" with a member 21 affixed to the top edge of the lens and a downwardly extending member 22 situated adjacent the top edge of the front surface of the lens, as seen in FIGS. 6 and 7.

Extending forwardly from surface 22 are two protrusions 24. Protrusions 24 are received in recesses 26 on the brow bar to accurately position the coupling part 16, and hence the lens 10, relative to the brow bar 18. Although each protrusion 24 may consist of a single blade, two spaced blades, as shown in FIG. 6, are preferred.

Three recesses 28 are provided on the brow bar 18 to receive magnets 30. Since the coupling part member 22 is made of magnetically attractive material, coupling part 16 will be engaged and retained by magnets 30 to the brow bar. Thus, the magnets 30 and the protrusion/recess combinations 24, 26 serve to removably mount and accurately position the lens on the browbar in a simple manner, easily understood and useable by even the most unsophisticated user, without advance instruction or special skill.

FIGS. 8–12 illustrate the second preferred embodiment of the present invention. This embodiment differs from the first embodiment principally with respect to the position of the coupling part relative to the brow bar, which in this embodiment engages the front of the brow bar.

The upside down "L" shaped coupling part 16 has member 21 affixed to the top edge of the lens and member 22 adjacent the rear surface of the lens. Thus, protrusion 24, only one of which is present in this embodiment, extends rearwardly from the lens. The recess 26, into which the protrusion 24 is received, is located on the front surface of brow bar 18, as are magnets 30, two of which are provided.

FIGS. 13–17 illustrate the third preferred embodiment of the present invention. In this embodiment, the operative surface on member 21 of coupling part 16 is situated above the top of the brow bar, as shown in FIGS. 13 and 14. Magnets 30 are situated in recesses 28 in the brow bar with the magnets facing upwardly. Protrusion 24 extends downwardly from member 21 of coupling part 16.

Figure 18:
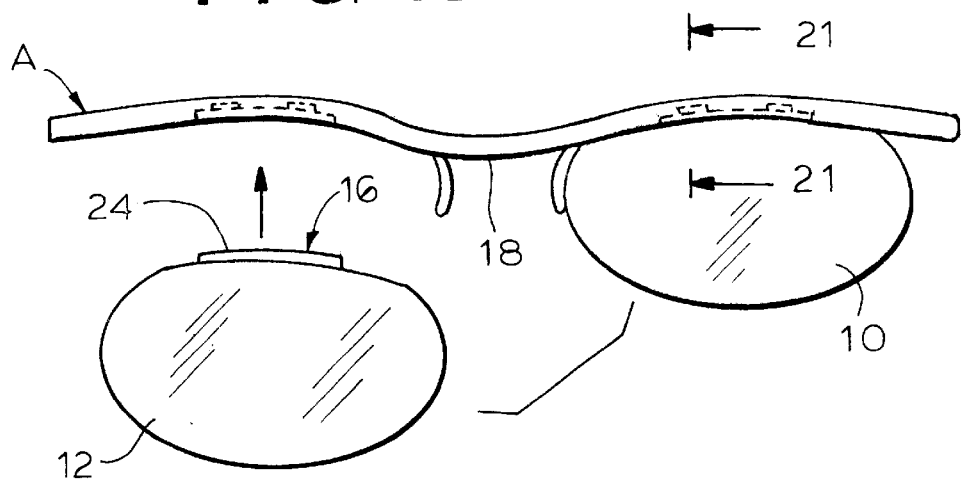
FIG. 18 is a front view of a fourth preferred embodiment of the present invention.
Figure 19:
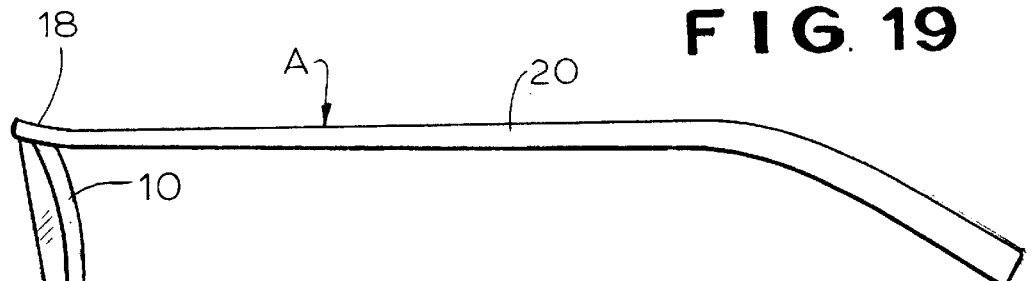
FIG. 19 is a side view of the embodiment of FIG. 18.

The fourth preferred embodiment is illustrated in FIGS. 18–21. In this embodiment, the operative surface of coupling part 16 is situated below the bottom surface of the brow bar, as shown in FIGS. 18 and 19.

Figure 20:
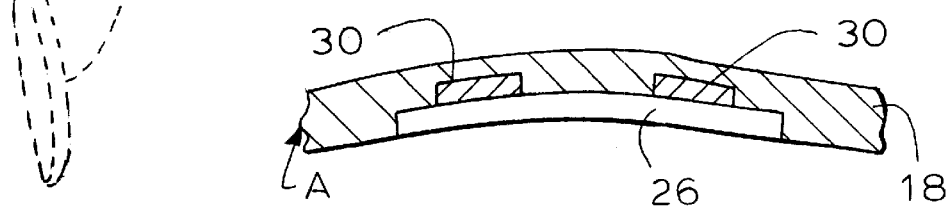
FIG. 20 is an enlarged cross-sectional view of a portion of the brow bar of FIG. 18.
Figure 21:
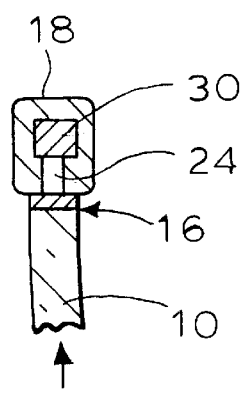
FIG. 21 is an enlarged cross-sectional view taken along line 21—21 of FIG. 18.

In this case, coupling part 16 includes a single elongated protrusion 24 which extends upwardly and is received within a downwardly directed elongated slot 26 in the brow bar. Magnets 30 are situated within brow bar 18, above and adjacent to slot 26, as best seen in FIGS. 20 and 21.

FIG. 22 illustrates a pn referred embodiment of the invention similar to that disclosed in FIGS. 3–7 except that coupling parts 16 a re connected together by a connecting part 40. Connecting part 40 is adapted to align with thee bridge portion of brow bar 18.

Figure 23:
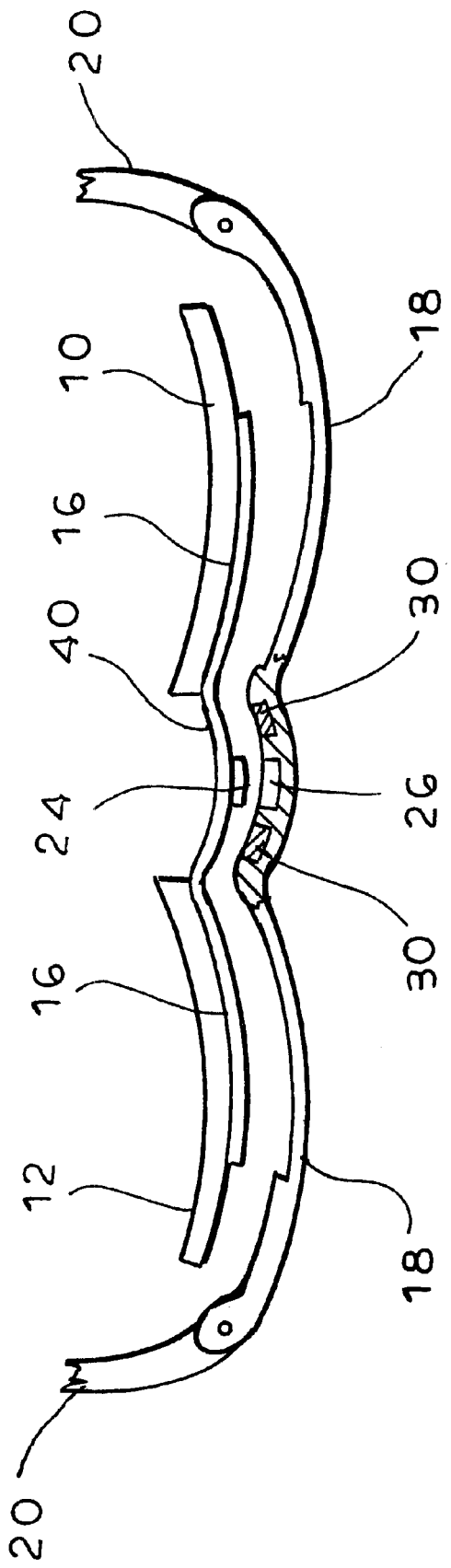
FIG. 23 is a top exploded view of a sixth preferred embodiment of the present invention in which the coupling parts are connected and the magnetic means are located on the brow bar bridge.

FIG. 23 illustrates a preferred embodiment similar to that shown in FIG. 22 except that in this embodiment, magnets 30 and recess 26 are located on the bridge portion of brow bar 18. Further, protrusion 24 extends from connecting part 40.

FIG. 24 illustrates a preferred embodiment similar to that of FIG. 23 except that two spaced slots 26 are present on the brow bar bridge. In this embodiment, coupling parts 16 are not connected. However, they are provided with extensions 42 and 44 upon which protrusions 24 are located.

It will now be appreciated that the present invention consists of lens/coupling part assemblies which require only simple, conventional fabrication techniques and tools, known to eyewear professionals. The combination of the magnetic engaging means and the lens positioning means permits the lenses to be mounted and positioned on the brow bar by the user without advance instruction or special skill. The eyeglasses of the present invention are thus inexpensive to fabricate and easy to use.

While only a limited number of preferred embodiments of the present invention have been disclosed for purposes of illustration, it is obvious that many variations and modifications could be made therein. It is intended to cover all of these variations and modifications which fall within the scope of the present invention, as defined by the following claims.

I claim:

1. Apparatus for removably mounting a lens to an eyeglass frame having a brow bar, said apparatus comprising a part affixed to the lens, said part comprising a first substantially flat surface section, first positioning means and first magnetic coupling means, said brow bar comprising a second substantially flat surface section, second positioning means and second magnetic coupling means, said first and second positioning means cooperating such that said first and second surface sections align and said first and second magnetic coupling means engage to mount the lens on the frame, wherein said first positioning means comprises a protrusion and said second positioning means comprises protrusion receiving means.

2. The apparatus of claim 1 wherein said first positioning means is associated with said first surface section and said second positioning means is associated with said second surface section.

3. The apparatus of claim 1 wherein said first magnetic coupling means is associated with said first surface section and said second magnetic coupling means is associated with said second surface section.

4. The apparatus of claim 1 wherein said first magnetic coupling means comprises a magnetically attractive section and said second magnetic coupling means comprises a magnet.

5. The apparatus of claim 1 wherein said first positioning means comprises first and second protrusions and said second positioning means comprises first and second protrusion receiving recesses.

6. Apparatus for removably mounting a lens to an eyeglass frame having a brow bar, said apparatus comprising a part affixed to the lens, said part comprising first positioning means and first magnetic coupling means, said brow bar comprising second positioning means and second magnetic coupling means, said second positioning means being spaced from said second magnetic coupling means along said brow bar, said first and second positioning means cooperating such that said first and second magnetic coupling means engage to mount the lens on the frame, wherein said first positioning means comprises a protrusion and said second positioning means comprises protrusion receiving means.

7. The apparatus of claim 6 wherein said first positioning means is spaced from said first magnetic coupling means along said part.

8. The apparatus of claim 6 wherein said first magnetic coupling means comprises a magnetically attractive section and said second magnetic coupling means comprises a magnet upwardly from said brow bar.

9. The apparatus of claim 6 wherein said first positioning means comprises first and second protrusions and said second positioning means comprises first and second protrusion receiving recesses.

10. Apparatus for removably mounting a lens to an eyeglass frame having a brow bar, the lens having a surface, said apparatus comprising a part affixed to the lens, said part comprising a member extending in a direction substantially parallel to the lens surface, said member comprising first positioning means and first magnetic coupling means, said brow bar comprising second positioning means and second magnetic coupling means, said first and second positioning means cooperating such that said first and second magnetic coupling means engage to mount the lens on the frame, wherein said first positioning means comprises a protrusion and said second positioning means comprises a protrusion receiving recess.

11. The apparatus of claim 10 wherein said part comprises a second member extending above the lens.

12. The apparatus of claim 11 wherein said first and second members are substantially perpendicular to each other.

13. The apparatus of claim 10 wherein said part has a substantially "L" shaped cross-sectional shape.

14. The apparatus of claim 10 wherein said first positioning means extends in a direction substantially perpendicular to the lens surface.

15. The apparatus of claim 10 wherein said second positioning means extends in a direction substantially perpendicular to the lens surface.

16. The apparatus of claim 10 wherein said first magnetic coupling means comprises a magnetically attractive section and said second magnetic coupling means comprises a magnet 55.

17. The apparatus of claim 10 wherein said first positioning means comprises first and second protrusions and said second positioning means comprises first and second protrusion receiving recesses.

18. Apparatus for removably mounting a lens to an eyeglass frame having a brow bar, said apparatus comprising a part affixed to the lens, said part comprising a member extending over the lens and beyond the plane of the lens, said apparatus comprising first positioning means extending downwardly from said member and first magnetic coupling means, said brow bar comprising second positioning means extending upwardly and second magnetic coupling means, said first and second positioning means cooperating such that said first and second magnetic coupling means engage to mount the lens on the frame, wherein said first positioning means comprises a protrusion and said second positioning means comprises a protrusion receiving recess.

19. The apparatus of claim 18 wherein said first magnetic coupling means is directed downwardly from said member.

20. The apparatus of claim 18 wherein said second magnetic coupling means is directed upwardly from said brow bar.

21. The apparatus of claim 18 wherein said first magnetic coupling means comprises a magnetically attractive section and said second magnetic coupling means comprises a magnet.

22. The apparatus of claim 18 wherein said first positioning means comprises first and second protrusions and said second positioning means comprises first and second protrusion receiving recesses.

* * * * *